(12) United States Patent
Yamamoto

(10) Patent No.: US 10,657,579 B2
(45) Date of Patent: May 19, 2020

(54) SYSTEM AND METHOD FOR DETERMINING AND ENABLING ACCESS TO A SERVICE PROVIDER SYSTEM FOR PRINT ORDER PROCESSING

(71) Applicant: CANON KABUSHIKI KAISHA, Tokyo (JP)

(72) Inventor: Hiroyuki Yamamoto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 448 days.

(21) Appl. No.: 15/408,998

(22) Filed: Jan. 18, 2017

(65) Prior Publication Data

US 2017/0213275 A1 Jul. 27, 2017

(30) Foreign Application Priority Data

Jan. 26, 2016 (JP) .................................. 2016-012851

(51) Int. Cl.
*G06Q 30/00* (2012.01)
*G06Q 30/06* (2012.01)

(52) U.S. Cl.
CPC ..... *G06Q 30/0635* (2013.01); *G06Q 30/0613* (2013.01); *G06Q 30/0621* (2013.01); *G06Q 30/0643* (2013.01)

(58) Field of Classification Search
CPC ..... G06Q 30/06; G06Q 30/0601–0643; G06Q 30/08
See application file for complete search history.

(56) References Cited

U.S. PATENT DOCUMENTS

2002/0067500 A1* 6/2002 Yokomizo ............... G06T 11/60
358/1.15
2005/0206864 A1* 9/2005 Garfinkle ............. G03D 15/005
355/40

(Continued)

FOREIGN PATENT DOCUMENTS

JP 2008-004077 1/2008

OTHER PUBLICATIONS

Photofinishers Go the Silicon Route, Too Austen, Ian New York Times (1923—Current file); May 23, 2002; (Year: 2002).*

(Continued)

*Primary Examiner* — William J Allen
(74) *Attorney, Agent, or Firm* — Venable LLP

(57) ABSTRACT

A system includes a client terminal capable of ordering merchandise of an online store service from a service providing system of a plurality of service providing systems and process an order of merchandise of the online store service, and an information processing apparatus capable of communicating with the client terminal. The information processing apparatus receives data created by the client terminal using a predetermined application and used to order the merchandise of the online store service, transmits access information used to make the client terminal access a service providing system, of the plurality of service providing systems, corresponding to the predetermined application, and receives a request of the received data from the service providing system that has accepted access based on the transmitted access information. Data received by the first reception unit is transmitted to the service providing system that has transmitted the request.

16 Claims, 17 Drawing Sheets

(56) References Cited

U.S. PATENT DOCUMENTS

2007/0258108 A1\* 11/2007 Matsumoto .......... G06Q 10/087
358/1.15
2018/0357696 A1\* 12/2018 DuBois .............. G06Q 30/0621

OTHER PUBLICATIONS

What Kodak Needs to Do to Survive Fisher, Jim. PC Magazine Online: NA. Ziff Davis, Inc. (Jan. 19, 2012) (Year: 2012).\*

\* cited by examiner

FIG. 10

| Key | Value |
|---|---|
| ALBUM DATA ID | 000000000000001 |
| STATUS | UPLOADED |
| PHOTO ALBUM DATA STORAGE LOCATION PATH | /albumdata/20151210/000000000000001 |
| ALBUM INFORMATION: MERCHANDISE ID | PRODUCT_ID_0001 |
| ALBUM INFORMATION: SIZE | L |
| ALBUM INFORMATION: NUMBER OF PAGES | 32 |
| ALBUM INFORMATION: FRONT COVER TYPE | HARD COVER |
| ALBUM INFORMATION: PAGE TYPE | GLOSSY PAPER |

FIG. 11

| APPLICATION ID | DOMAIN INFORMATION | ONLINE STORE SERVICE ID |
|---|---|---|
| APP_ID_0001 | onlinestore0001.com | Store_net |
| APP_ID_0002 | onlineshop0002.co.jp | Shop_net |
| APP_ID_0003 | onlineshop0002.co.jp | Shop_net |
| APP_ID_0004 | photojewel.co.jp | Jewel_net |

F I G. 12

| MANAGEMENT SERVICE MERCHANDISE ID | ONLINE STORE SERVICE ID | ONLINE STORE SERVICE MERCHANDISE ID |
|---|---|---|
| PRODUCT_ID_0001 | Store_net | SID_AAAAA |
| PRODUCT_ID_0002 | Store_net | SID_BBBBB |
| ... | ... | ... |
| PRODUCT_ID_0001 | Jewel_net | JID_XXXXX |
| PRODUCT_ID_0002 | Jewel_net | JID_YYYYY |

F I G. 13

| Key | Value |
|---|---|
| SHOPPING CART ID | 0000000000000001 |
| SHOPPING CART URL | https://onlinestore.com/xxxx |
| STATUS | UNSETTLED |
| ALBUM DATA ID | 0000000000000001 |
| ONLINE STORE SERVICE ID | Store_net |

FIG. 14

| ONLINE STORE SERVICE ID | ALBUM MERCHANDISE ID | LABORATORY SYSTEM ID |
|---|---|---|
| Store_net | PRODUCT_ID_0001 | Labo_00022 |
| Store_net | PRODUCT_ID_0002 | Labo_00033 |
| Jewel_net | PRODUCT_ID_0001 | Labo_10001 |
| Jewel_net | PRODUCT_ID_0002 | Labo_10001 |

FIG. 15

| Key | Value |
|---|---|
| ORDER DATA ID | 0000000000000001 |
| ORDER DATA STORAGE LOCATION PATH | /orderdata/20151210/99999999999 |
| STATUS | UNRECEIVED |
| ASSIGNED LABORATORY ID | Labo_00022 |
| DELIVERY DESTINATION | 〒000-9999<br>SHINAGAWA WARD, TOKYO... |
| DESIRED APPOINTED DATE FOR DELIVERY | 2015/12/24 |

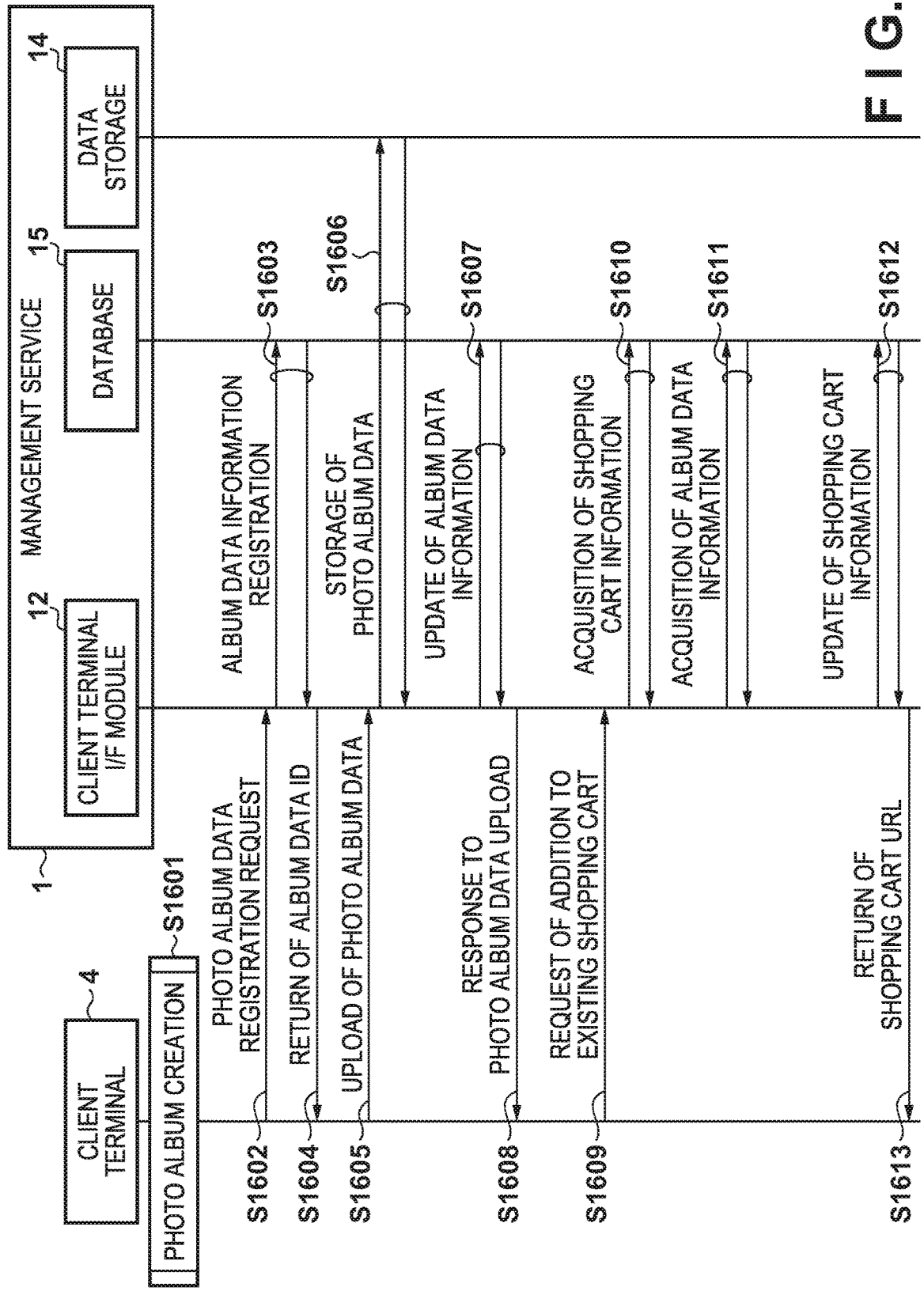

SYSTEM AND METHOD FOR DETERMINING AND ENABLING ACCESS TO A SERVICE PROVIDER SYSTEM FOR PRINT ORDER PROCESSING

BACKGROUND OF THE INVENTION

Field of the Invention

The present invention relates to an information processing apparatus, a method, and a storage medium storing a program.

Description of the Related Art

A service is recently known which allows a user to customize merchandise as he/she likes on a terminal (to be referred to as a client terminal hereinafter) such as a PC or a tablet PC used by the user and order the customized merchandise. An example of the service is a photo album service. To use the photo album service, a user first lays out image data stored on a client terminal or still image data extracted from moving image data to create a photo album. The user then uploads the created photo album data via a communication network such as the Internet to a management service that manages data associated with the photo album service. After that, the user accesses the order acceptance screen of the photo album service via a web browser or the like and performs order processing. In a case where the order processing is executed, the management service that has received the photo album data instructs a laboratory where a printer is placed to manufacture and ship the photo album, and the photo album is thus sent to a delivery destination designated by the user.

In the service that allows the user to order the customized merchandise, a management service that manages the data associated with the merchandise is needed to accept the data created by the user or instruct the laboratory to make the merchandise. Japanese Patent Laid-Open No. 2008-004077 describes a technique of accepting image data and an order from a user terminal and causing a laboratory system to make a product according to the order.

In the system described in Japanese Patent Laid-Open No. 2008-004077, however, a management service that manages photo album data and an order acceptance service that processes an order are constructed as one system existing in the same network. That is, the management service described in Japanese Patent Laid-Open No. 2008-004077 supports only one order acceptance service (online store service) in the same network but does not support a plurality of different order acceptance services.

SUMMARY OF THE INVENTION

An aspect of the present invention is to eliminate the above-mentioned problems with the conventional technology. The present invention provides a management server capable of supporting a plurality of online store services.

The present invention in one aspect provides an information processing apparatus capable of communicating with a plurality of service providing systems each configured to provide an online store service and process an order of merchandise of the online store service, and a client terminal configured to order the merchandise of the online store service to a service providing system of the plurality of service providing systems, comprising: a first reception unit configured to receive data created by the client terminal using a predetermined application and used to order the merchandise of the online store service; a first transmission unit configured to, in a case where the first reception unit receives the data, transmit access information used to make the client terminal access a service providing system, of the plurality of service providing systems, corresponding to the application used to create the data received by the first reception unit; a second reception unit configured to receive a request of the data received by the first reception unit from the service providing system that has accepted access based on the access information transmitted by the first transmission unit; and a second transmission unit configured to transmit, according to the request received by the second reception unit, the data received by the first reception unit to the service providing system that has transmitted the request.

According to the present invention, it is possible to provide a management server capable of supporting a plurality of online store services.

Further features of the present invention will become apparent from the following description of exemplary embodiments with reference to the attached drawings.

BRIEF DESCRIPTION OF THE DRAWINGS

FIG. 10 is a view showing album data information;

FIG. 11 is a view showing the correspondence information between an album creation application and an online store service;

FIG. 12 is a view showing the correspondence information between a management service merchandise ID and an online store service merchandise ID;

FIG. 13 is a view showing shopping cart information;

FIG. 14 is a view showing laboratory system information;

FIG. 15 is a view showing order data;

FIG. 16 is a sequence chart up to order processing for the management service;

DESCRIPTION OF THE EMBODIMENTS

Figure 1:
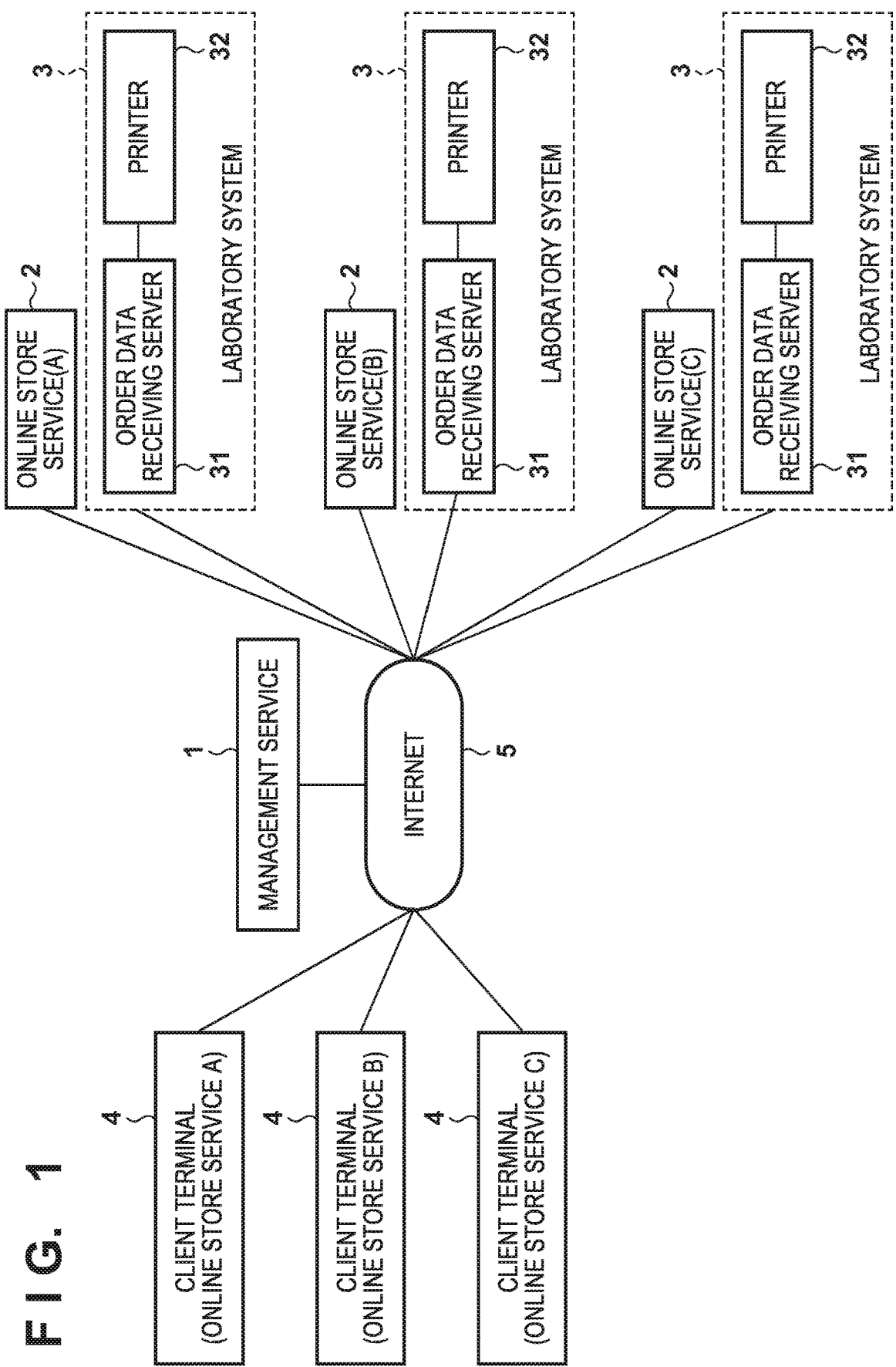
FIG. 1 is a block diagram showing the arrangement of a photo album creation/order system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same reference numerals denote the same constituent elements, and a description thereof will be omitted.

First Embodiment

An information processing apparatus according to this embodiment will be described first. In this embodiment, a personal computer (PC) is exemplified as the information processing apparatus. However, the present invention is not limited to this. For example, various apparatuses such as a tablet terminal, a PDA (Personal Digital Assistant), a digital camera, a TV, and a printer can be applied. FIG. 1 is a block diagram showing an example of the arrangement of a photo album creation/order system formed from the information processing apparatus according to this embodiment. Referring to FIG. 1, the systems of a management service 1, an online store service 2, a laboratory system 3, and a client terminal 4 are communicably connected to each other via the Internet 5.

The management service 1 is a system formed from an information processing apparatus connected to the online store service 2, the laboratory system 3, and the client terminal 4 via the Internet 5. The management service 1 manages data used to create merchandise, for example, a "photo album" provided by the online store service 2. The data used to create a "photo album" is, for example, data (image data and setting information of a photo album) created/edited by an album creation application on the client terminal 4.

The online store service 2 is a system formed from an information processing apparatus having a function of providing a photo album service to the client terminal 4 and accepting an order request from the client terminal 4 and making the settlement of the order price. The laboratory system 3 is a system including a printer 32 configured to print a photo album, and an order data receiving server 31 that communicates with the management service 1 via the Internet 5. In this embodiment, a system including the online store service 2 and the laboratory system 3 will be referred to as a service providing system.

The client terminal 4 is an information processing apparatus in which an album creation application having a function of laying out image data on a template and creating photo album data is installed. The album creation application installed in the client terminal 4 holds an application ID (identification information) associated with the online store service 2 by the management service 1. This is because the online store of an album order destination is decided by the album creation application installed in the client terminal 4. Note that the application ID changes depending on, for example, a web site where the album creation application is installed or the vender of the album creation application. Based on the application ID, the management service 1 can acquire the information of the online store service 2 associated with the client terminal 4.

As shown in FIG. 1, there may exist one or more client terminals 4, online store services 2, and laboratory systems 3 in correspondence with the management service 1.

Figure 17:
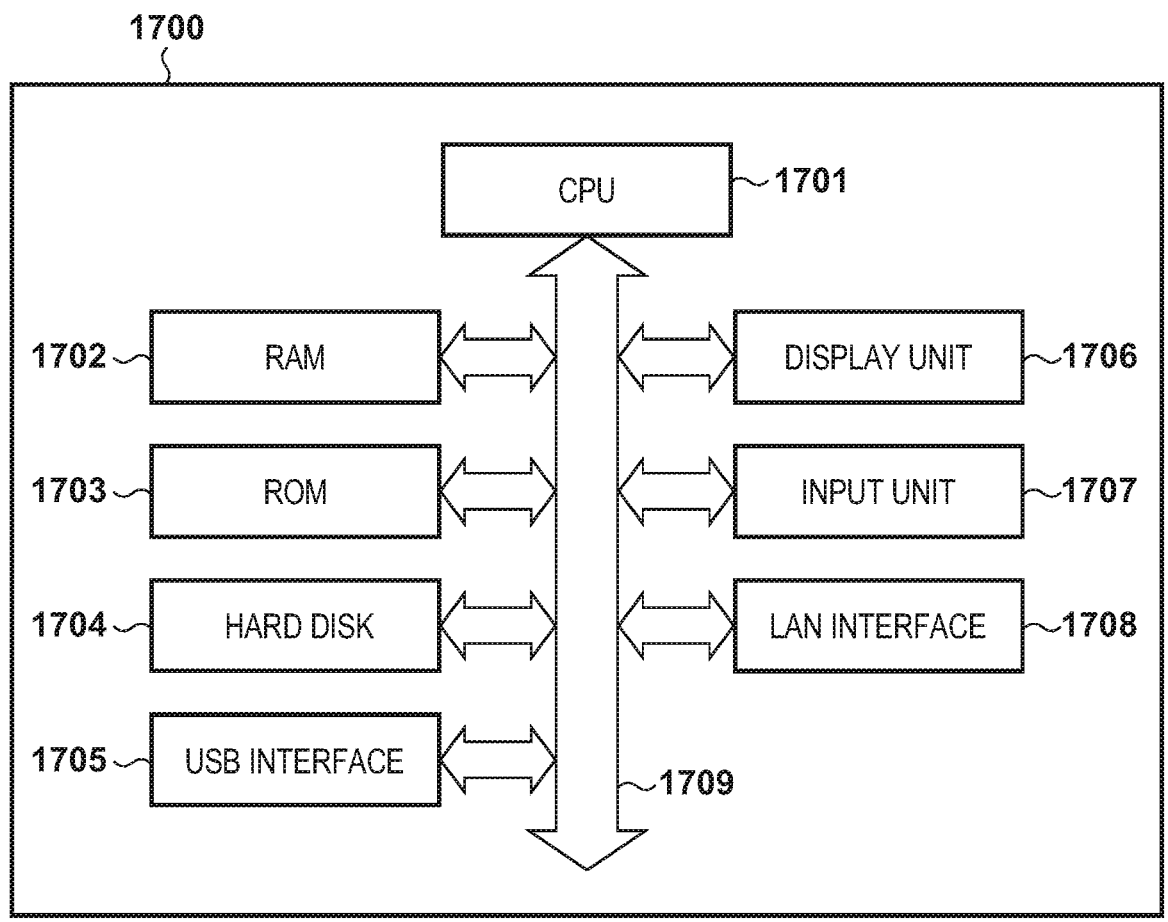
FIG. 17 is a block diagram showing the internal arrangement of an information processing apparatus.

FIG. 17 is a block diagram showing an example of the internal arrangement of the information processing apparatus that constitutes each of the management service 1 the online store service 2, the laboratory system 3, and the client terminal 4 shown in FIG. 1. Note that the information processing apparatuses that constitute the above-described services, system, and terminal need not have the same arrangement and may have individual arrangements.

A CPU 1701 processes data or an instruction in accordance with a program stored in a RAM 1702, a ROM 1703, or a hard disk 1704. The RAM 1702 is used as a temporary storage area in a case where the CPU 1701 performs various kinds of processing. The hard disk 1704 stores an operating system (OS), a web browser (to be referred to as a browser hereinafter), and other pieces of application software. In the client terminal 4, the album creation application is also stored in the hard disk 1704. A USB interface 1705 is an interface connected to a USB cable. This interface is used to, for example, perform data communication with an external information processing apparatus such as a printer. Note that in this case, communication with the external information processing apparatus may be done not via a USB cable but via a SCSI or wirelessly.

A display unit 1706 is formed from a CRT or a liquid crystal display and a graphic controller, and displays, for example, a web page downloaded from an external server to an information processing apparatus 1700, a print preview image, a GUI, or the like. An input unit 1707 is a device that allows the user to input various kinds of instructions to the information processing apparatus 1700, and is formed from, for example, a pointing device or a keyboard. A system bus 1709 connects the CPU 1701, the RAM 1702, the ROM 1703, the hard disk 1704, and the like. Data to be processed by each constituent element is communicated on the system bus 1709. A LAN interface 1708 is an interface used to connect a LAN cable. Using the LAN interface 1708, the information processing apparatus 1700 can perform data communication by a LAN cable with an external server or a printer via a router (not shown) or a network. If an interface for supporting wireless communication is formed in the information processing apparatus 1700, the information processing apparatus 1700 can wirelessly perform data communication. In this case, various methods such as Wi-Fi (Wireless Fidelity)® and Bluetooth® can be employed as the wireless communication method.

Figure 2:
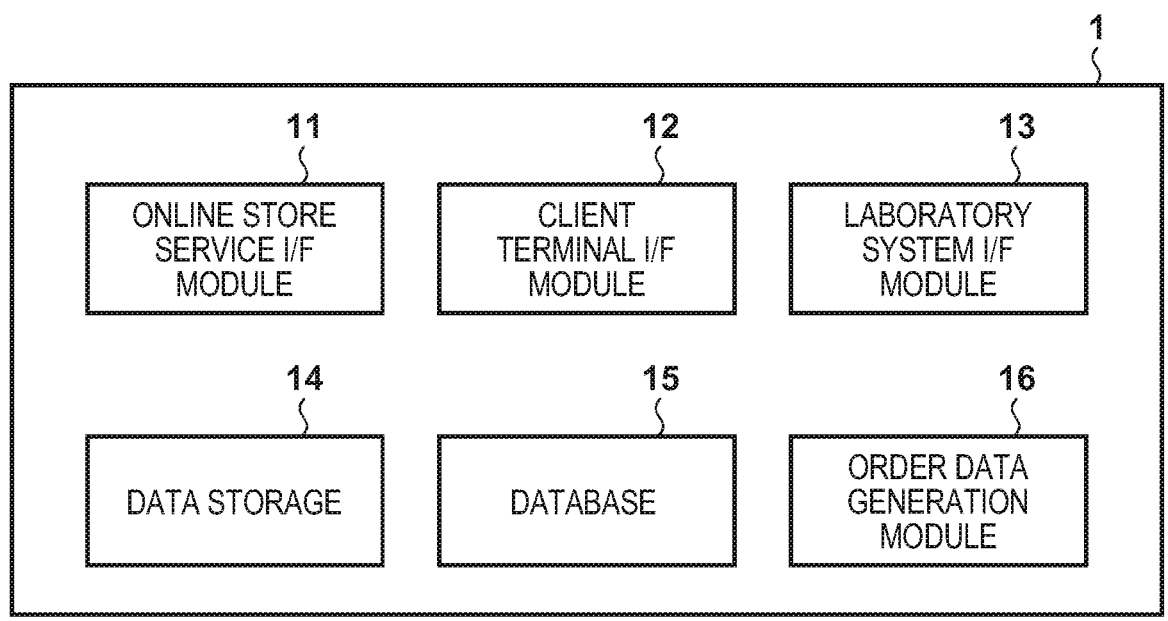
FIG. 2 is a block diagram showing the arrangement of a management service.

FIG. 2 is a block diagram showing an example of components included in the information processing apparatus that constitutes the management service 1. Note that if the management service 1 is formed from a plurality of information processing apparatuses, the components shown in FIG. 2 may exist in different information processing apparatuses. In addition, a plurality of information processing apparatuses may cause one component to function. An online store service interface (I/F) module 11 has a function of communicating with the online store service 2 via the Internet 5 and receiving and processing a request from the online store service 2. A client terminal I/F module 12 has a function of communicating with the client terminal 4 via the Internet 5 and receiving and processing a request from the client terminal 4. A laboratory system I/F module 13 has a function of communicating with the laboratory system 3 via the Internet 5 and receiving and processing a request from the laboratory system 3.

A data storage 14 includes a storage area (an HDD or the like) that stores photo album data received from the client terminal 4 or order data to be transmitted in accordance with a request from the laboratory system 3. A database 15 is a general database. An order data generation module 16 has a function of generating order data to order a photo album. Order data includes information needed by the laboratory system 3 to bind/ship a photo album such as photo album data uploaded from the client terminal 4 and the information of a photo album delivery destination notified by the online store service 2.

The above-described modules 11, 12, 13, and 16 are implemented by, for example, the CPU in the information processing apparatus that constitutes the management service 1. The data storage 14 and the database 15 are implemented by, for example, the ROM or hard disk in the information processing apparatus that constitutes the management service 1. Processing performed by the management service 1 according to this embodiment is implemented by, for example, reading out and executing, by the CPU, a program stored in the ROM of the information processing apparatus that constitutes the management service 1.

Figure 3:
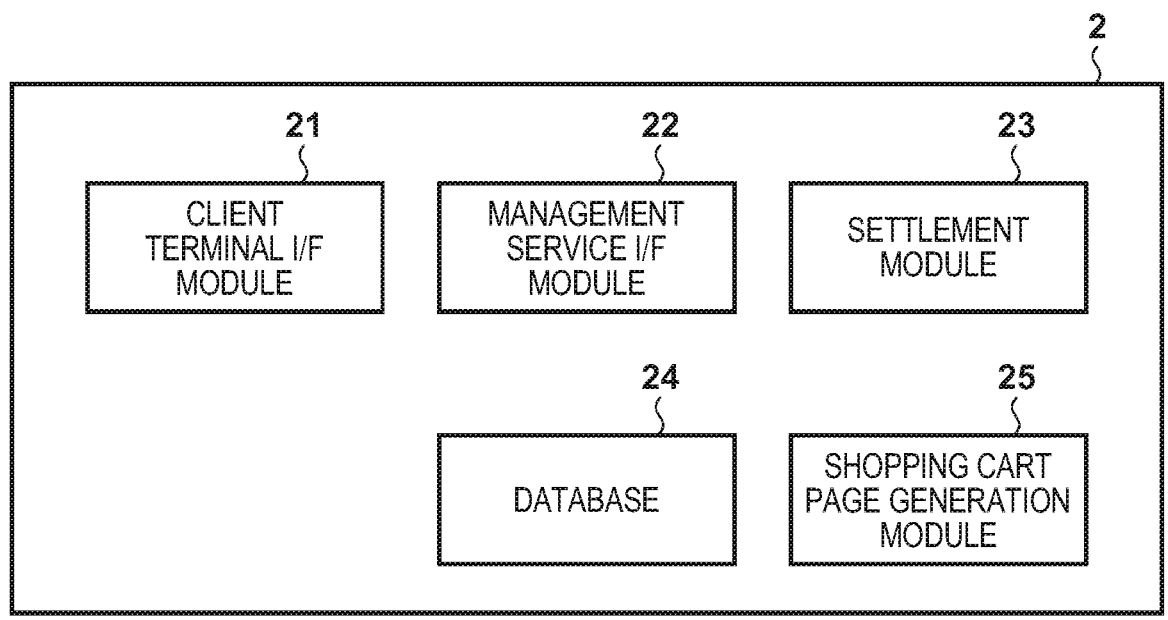
FIG. 3 is a block diagram showing the arrangement of an online store service.

FIG. 3 is a block diagram showing an example of components included in the information processing apparatus that constitutes the online store service 2. Note that if the online store service 2 is formed from a plurality of information processing apparatuses, the components shown in FIG. 3 may exist in different information processing apparatuses. In addition, a plurality of information processing apparatuses may cause one component to function. Referring to FIG. 3, a client terminal I/F module 21 has a function of communicating with the client terminal 4 via the Internet 5 and receiving and processing a request from the client terminal 4. A management service I/F module 22 has a function of communicating with the management service 1 via the Internet 5 and sending various requests (to be described later) to the management service 1. A settlement module 23 has a function of executing settlement processing of a photo album ordered by the user. A database 24 stores the order information of photo album data received by the client terminal I/F module 21. A shopping cart page generation module 25 has a function of generating a screen (shopping cart page) configured to make the user execute photo album order processing.

The client terminal I/F module 21, the management service I/F module 22, the settlement module 23, and the shopping cart page generation module 25 are implemented by, for example, the CPU in the information processing apparatus that constitutes the online store service 2. The database 24 is implemented by, for example, the ROM or hard disk in the information processing apparatus that constitutes the online store service 2. Processing executed by the online store service 2 according to this embodiment is implemented by, for example, reading out and executing, by the CPU, a program stored in the ROM 1703 of the information processing apparatus that constitutes the online store service 2.

Figure 4:
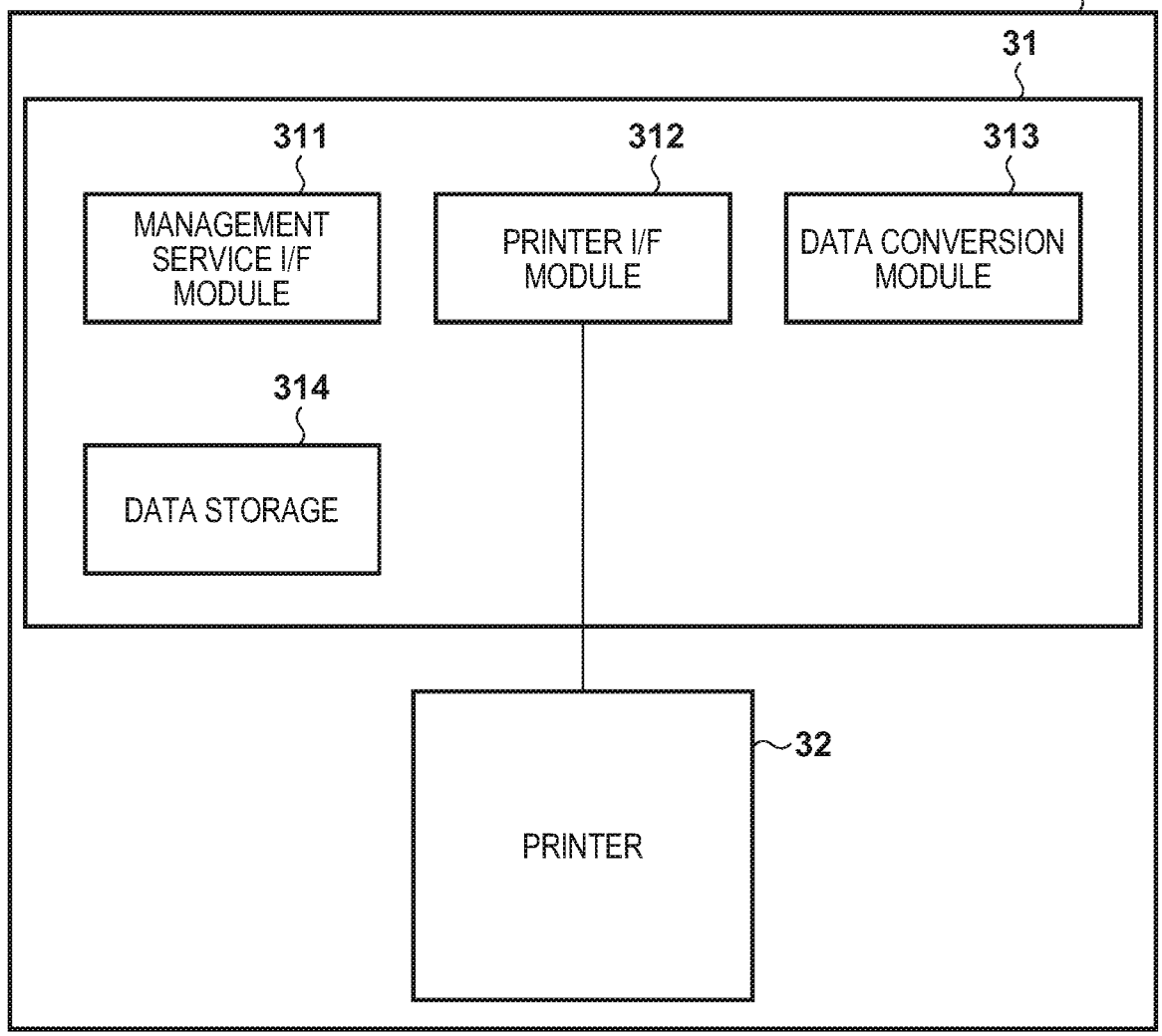
FIG. 4 is a block diagram showing the arrangement of a laboratory system.

FIG. 4 is a block diagram showing an example of components included in the information processing apparatus that constitutes the laboratory system 3. Referring to FIG. 4, a management service I/F module 311 is a module that constitutes the order data receiving server 31 shown in FIG. 1, and has a function of communicating with the management service 1 via the Internet 5 and requesting order data or the like from the management service 1. A printer I/F module 312 has a function of communicating with the printer 32 via the network and instructing the printer 32 to generate a photo album. A data conversion module 313 has a function of converting photo album data received by the management service I/F module 311 into data that enables the printer 32 to do printing/bookbinding. A data storage 314 includes a storage area used to store photo album data received by the management service I/F module 311 or data generated by executing conversion processing by the data conversion module 313.

The management service I/F module 311, the printer I/F module 312, and the data conversion module 313 are implemented by, for example, the CPU in the information processing apparatus that constitutes the order data receiving server 31. The data storage 314 is implemented by, for example, the ROM or hard disk in the information processing apparatus that constitutes the order data receiving server 31. Processing executed by the order data receiving server 31 according to this embodiment is implemented by, for example, reading out and executing, by the CPU, a program stored in the ROM of the information processing apparatus that constitutes the order data receiving server 31.

Figure 5:
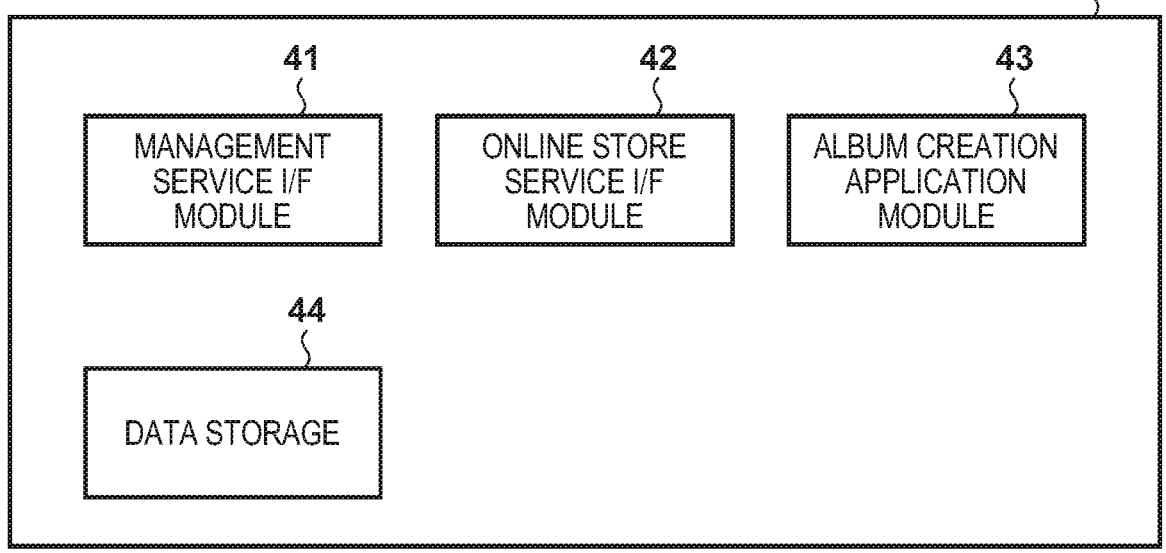
FIG. 5 is a block diagram showing the arrangement of a client terminal.

FIG. 5 is a block diagram showing an example of the arrangement of the client terminal 4. A management service I/F module 41 has a function of communicating with the management service 1 via the Internet 5. The management service I/F module 41 also has a function of uploading photo album data to the management service 1 or requesting a URL necessary to access the online store service 2. An online store service I/F module 42 has a function of communicating with the online store service 2 via the Internet 5 and requesting a URL or photo album order/settlement processing from the online store service 2. An album creation application module 43 provides a function to allow the user to create a photo album on the client terminal in which the album creation application is installed. A data storage 44 includes a storage area used to store photo album data that is being created by the album creation application module 43.

The management service I/F module 41, the online store service I/F module 42, and the album creation application module 43 are implemented by, for example, the CPU 1701 in information processing apparatus 1700 that constitutes the client terminal 4. The data storage 44 is implemented by, for example, the ROM or hard disk in the information processing apparatus that constitutes the client terminal 4. The operation of the client terminal 4 according to this embodiment is implemented by, for example, reading out and executing, by the CPU, a program stored in the ROM of the information processing apparatus that constitutes the client terminal 4.

A processing procedure executed by each system from photo album order to printing, bookbinding, and shipment by the laboratory system 3 will be described next.

Figure 6:
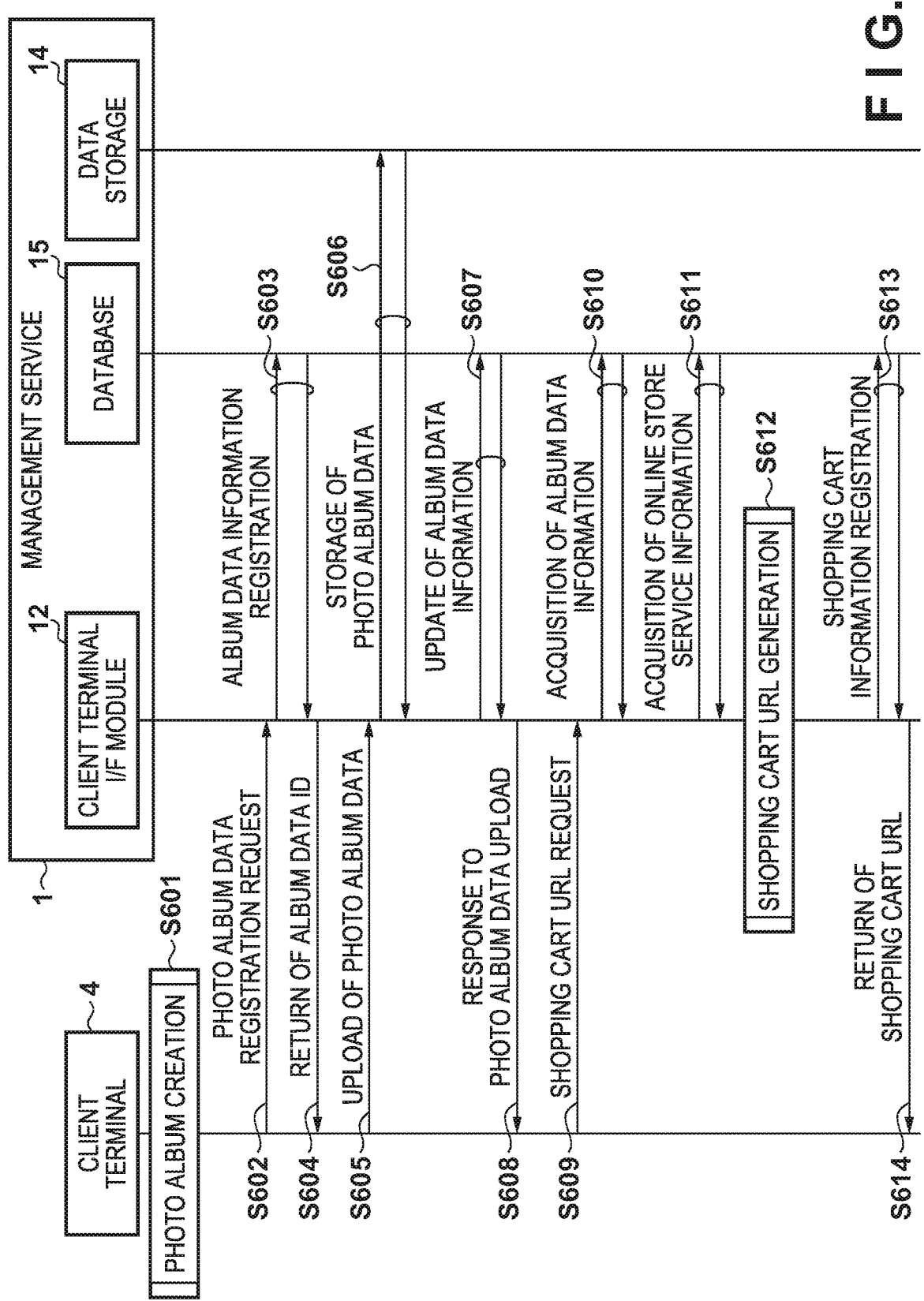
FIG. 6 is a sequence chart up to shopping cart URL acquisition.

FIG. 6 is a sequence chart showing a processing procedure executed by the client terminal 4 and the management service 1 from photo album data creation up to shopping cart URL acquisition by the client terminal 4. Note that the sequence shown in FIG. 6 is implemented by, for example, reading out a program stored in a memory such as a ROM to a RAM and executing the program by the CPUs in the information processing apparatuses that constitute the client terminal 4 and the management service 1.

First, the client terminal 4 receives a user operation and creates photo album data using the album creation application (step S601). The photo album data includes the layout information of the album, image data to be printed, and the information of set values such as the number of pages/size of the album. In a case where photo album data creation is completed, the client terminal 4 receives a user operation and orders the photo album. The management service I/F module 41 then transmits a photo album data registration request to the client terminal I/F module 12 (step S602).

Upon receiving the photo album data registration request, the client terminal I/F module 12 generates an album data ID corresponding to the received registration request and registers album data information in the database 15 together with the album data ID (step S603). The album data information is information used to manage the set values (the size, the number of pages, and the like) and status of the photo album data corresponding to the received registration request.

FIG. 10 is a view showing an example of album data information that the management service 1 manages on the database 15. "Album data ID" is an identifier uniquely representing album data. "Status" stores the status information of the album data. For example, information such as "waiting for upload" representing a state in which the photo album data corresponding to the album data ID is not uploaded or "uploaded" representing a state in which the photo album data is already uploaded is stored. "Photo album data storage location path" stores a path needed to access the storage location of the photo album data uploaded from the client terminal 4. "Album information" stores information necessary for the manufacture of the photo album such as the size, the number of pages, and the front cover type of the ordered photo album.

The client terminal I/F module 12 transmits the album data ID to the client terminal 4 (step S604). Upon receiving the album data ID and recognizing that the photo album data registration request is completed, the client terminal 4 transmits (uploads) the photo album data with the received album data ID to the management service 1 (step S605). The client terminal I/F module 12 stores the received photo album data in the data storage 14 in association with the album data ID (step S606). The client terminal I/F module 12 updates the status information of the album data information registered in the database 15 and corresponding to the received album data ID to "uploaded" (step S607). FIG. 10 shows an example of the album data information at the timing of step S607.

The client terminal 4 receives, from the management service 1, a response to the upload of the photo album data (step S608). The client terminal 4 transmits an application ID used to identify the album creation application installed in the client terminal 4 and the album data ID received in step S604 to the management service 1. The client terminal 4 also requests a shopping cart URL from the management service 1 (step S609). Upon receiving the shopping cart URL request, the client terminal I/F module 12 acquires, from the database 15, album data information corresponding to the album data ID received from the client terminal 4 (step S610).

Next, based on the application ID received from the client terminal 4, the client terminal I/F module 12 acquires domain information associated with the application ID from the database 15 (step S611). The domain information is access information used to access the online store service 2. The client terminal I/F module 12 acquires the domain information associated with the application ID by, for example, looking up a table shown in FIG. 11.

FIG. 11 is a view showing an example of the correspondence information table between the application ID and the online store service 2, which the management service 1 manages on the database 15. The table shown in FIG. 11 is used to decide an appropriate online store service corresponding to the application ID received from the client terminal 4. As shown in FIG. 11, for the client terminal 4, an application ID unique to each online store service 2 that provides a photo album service is issued and assigned by the management service 1. That is, the online store service 2 of the order destination is determined for each album creation application. Note that one online store service 2 corresponds to one client terminal 4 here. However, a plurality of online store services 2 may correspond to one client terminal 4. In this case, the client terminal 4 displays the list of corresponding online store services 2 and makes the user select the online store service 2 of the order destination. As indicated by APP_ID_0002 and APP_ID_0003 in FIG. 11, a single online store service 2 may be associated with different application IDs.

The client terminal I/F module 12 generates a shopping cart URL (step S612). More specifically, the client terminal I/F module 12 combines the acquired domain information and a path uniquely representing a shopping cart page configured to order the photo album corresponding to the data created in step S601, thereby generating a shopping cart URL. After that, the client terminal I/F module 12 registers, in the database 15, shopping cart information that associates the generated shopping cart URL with the album data information acquired in step S610 (step S613).

FIG. 13 is a view showing an example of shopping cart information that the management service 1 manages on the database 15. In particular, FIG. 13 shows an example of shopping cart information at the timing of step S613. "Shopping cart ID" is an identifier (key) uniquely representing the shopping cart information. "Status" stores the settlement state of the photo album ordered via the shopping cart URL associated with the shopping cart information. For example, there are "unsettled" representing a state in which the settlement of the photo album is not yet done and "settled" representing a state in which the settlement of the photo album is done. "Album ID" stores the album data ID of the photo album ordered via the shopping cart URL associated with the shopping cart information. Note that if a plurality of photo albums are ordered via the shopping cart URL associated with the shopping cart information, a plurality of album data IDs are stored. "Online store service ID" stores an identifier used to identify the online store service 2 that sells the photo album ordered via the shopping cart URL associated with the shopping cart information.

In a case where the processing up to step S613 is normally completed, the client terminal I/F module 12 transmits the shopping cart URL to the client terminal 4 (step S614).

With the above arrangement, the management service 1 can appropriately switch the online store service 2 for selling a photo album in accordance with the application ID held by the album creation application in the client terminal 4. For example, one album creation application that implements a photo album order function as described above can be made to support a photo album service provided by another online store service 2 only by changing the application ID. Note that an arrangement that allows the user to select, on the client terminal 4, the online store service 2 to process an order is also possible. In this case, one album creation application holds a plurality of application IDs. The client terminal 4 transmits the application ID corresponding to the selected online store service 2 to the management service 1 by the process of step S609.

Figure 7:
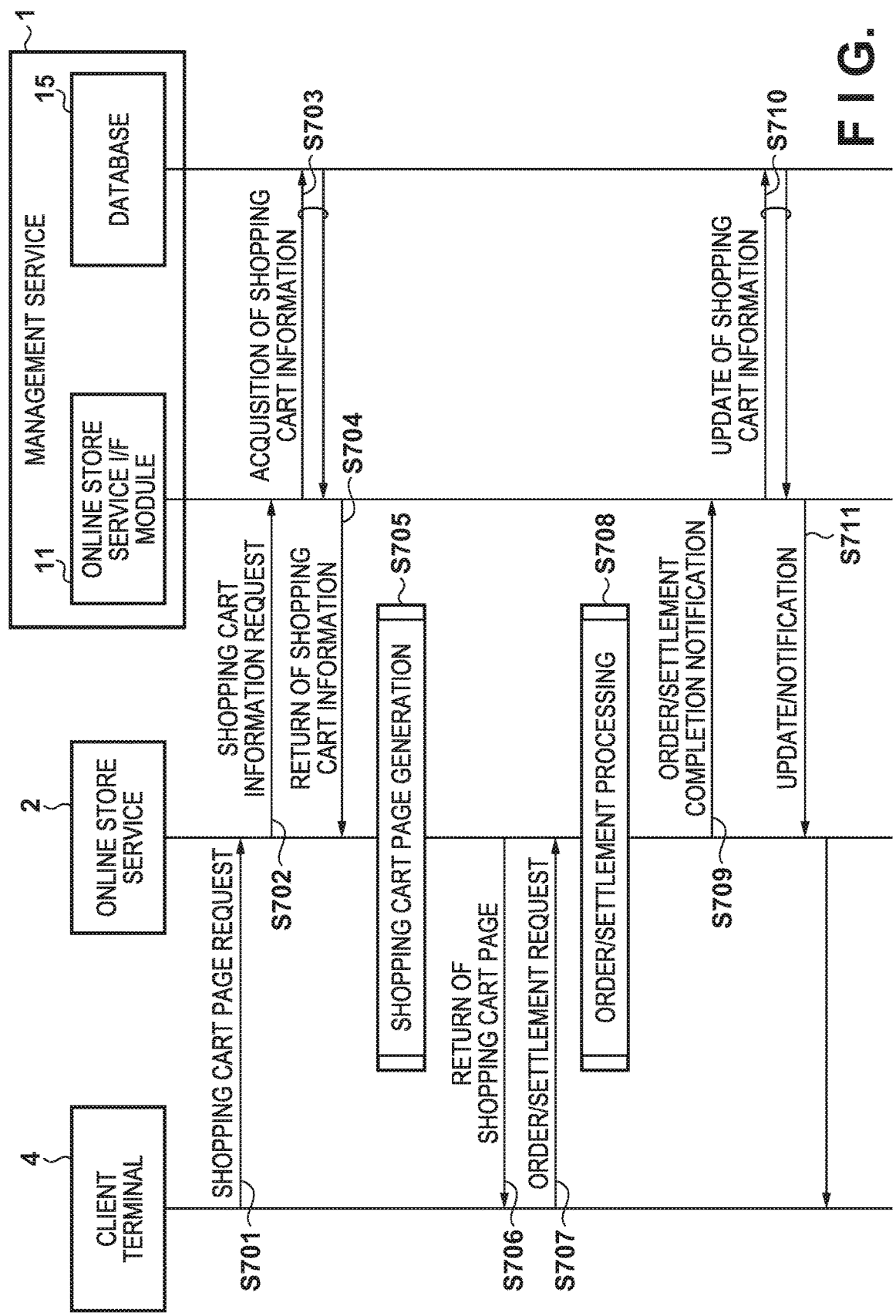
FIG. 7 is a sequence chart of photo album order and settlement processing.

FIG. 7 is a sequence chart showing a processing procedure executed by the client terminal 4, the management service 1, and the online store service 2 in a case where the client terminal 4 performs photo album order and settlement processing. Note that the sequence chart shown in FIG. 7 is implemented by, for example, reading out a program stored in a memory such as a ROM to a RAM and executing the program by the CPUs in the information processing apparatuses that constitute the client terminal 4, the management service 1, and the online store service 2. The client terminal 4 that has acquired the shopping cart URL in step S614 of FIG. 6 requests a shopping cart page corresponding to the acquired shopping cart URL from the online store service 2 (step S701). The online store service 2 requests shopping cart information corresponding to the requested shopping cart page from the management service 1 (step S702). Note that at this time, the online store service 2 transmits an online store service ID corresponding to itself or a shopping cart URL corresponding to the requested shopping cart information.

Upon receiving the shopping cart information request, the online store service I/F module 11 acquires, from the database 15, shopping cart information associated with the received shopping cart URL (step S703). The online store service I/F module 11 acquires an album data ID from the acquired shopping cart information, and acquires a management service merchandise ID from album data information based on the album data ID. Note that the management service merchandise ID is an ID used by the management service 1 to uniquely specify a merchandise type. For example, in the example shown in FIG. 10, album merchandise in which the size is L, the number of pages is 32, the front cover type is "hard cover", and the page type is "glossy paper" is specified by a management service merchandise ID "PRODUCT_ID_0001". The online store service I/F module 11 acquires an online store service merchandise ID based on the acquired management service merchandise ID and the online store service ID from an ID specifying table as shown in FIG. 12. The online store service merchandise ID is an ID used by the online store service to uniquely specify the merchandise type. The ID specifying table is a table used to specify the online store service merchandise ID corresponding to the management service merchandise ID. The management service specifies the merchandise type by the management service merchandise ID. However, the online store service specifies the merchandise type by an ID different from the management service merchandise ID. If the online store service changes, the ID to be used also changes. In a case where the management service merchandise ID is converted into an ID corresponding to each online store service by the ID specifying table, each online store service can specify the merchandise type ordered from the client terminal 4. That is, both the management service merchandise ID before conversion and the online store service merchandise ID after conversion specify the same merchandise type.

The online store service I/F module 11 transmits the requested shopping cart information to the online store service 2 together with the specified online store service merchandise ID (step S704). By receiving the online store service merchandise ID, the online store service 2 can know what kind of merchandise is ordered from the client terminal 4.

Note that in this embodiment, when registering the shopping cart information in step S613, the online store service merchandise ID may be acquired in the above-described way, and the acquired online store service merchandise ID may be included in the shopping cart information. In this case, the online store service merchandise ID need not be specified after step S703. The online store service merchandise ID can be transmitted to the online store service 2 only by transmitting the shopping cart information in step S704.

The online store service 2 creates, by the shopping cart page generation module 25, information used to display the shopping cart page based on the shopping cart information received in step S704 (step S705). After that, the created information is transmitted to the client terminal 4 (step S706). At this point of time, the shopping cart page is displayed on the client terminal 4, and a state in which order and settlement processing of the uploaded photo album can be executed using the shopping cart page is attained.

The client terminal 4 receives a user operation and requests order/settlement processing from the online store service 2 via the shopping cart page (step S707). The online store service 2 performs the order/settlement processing (step S708). In a case where the order/settlement processing is completed, the online store service 2 sends an order/settlement completion notification to the management service 1 (step S709). Upon receiving the order/settlement completion notification, the online store service I/F module 11 updates the status of the shopping cart information stored in the database 15 and corresponding to the received order/settlement completion notification to "settled" (step S710). For example, the status in FIG. 13 is updated from "unsettled" to "settled". The online store service I/F module 11 then notifies the online store service 2 that the status is updated (step S711).

The order/settlement completion notification in step S709 may include the information of the delivery destination of the photo album and a desired appointed date for delivery. In this case, these pieces of information are added to the shopping cart information in step S710.

Figure 8:
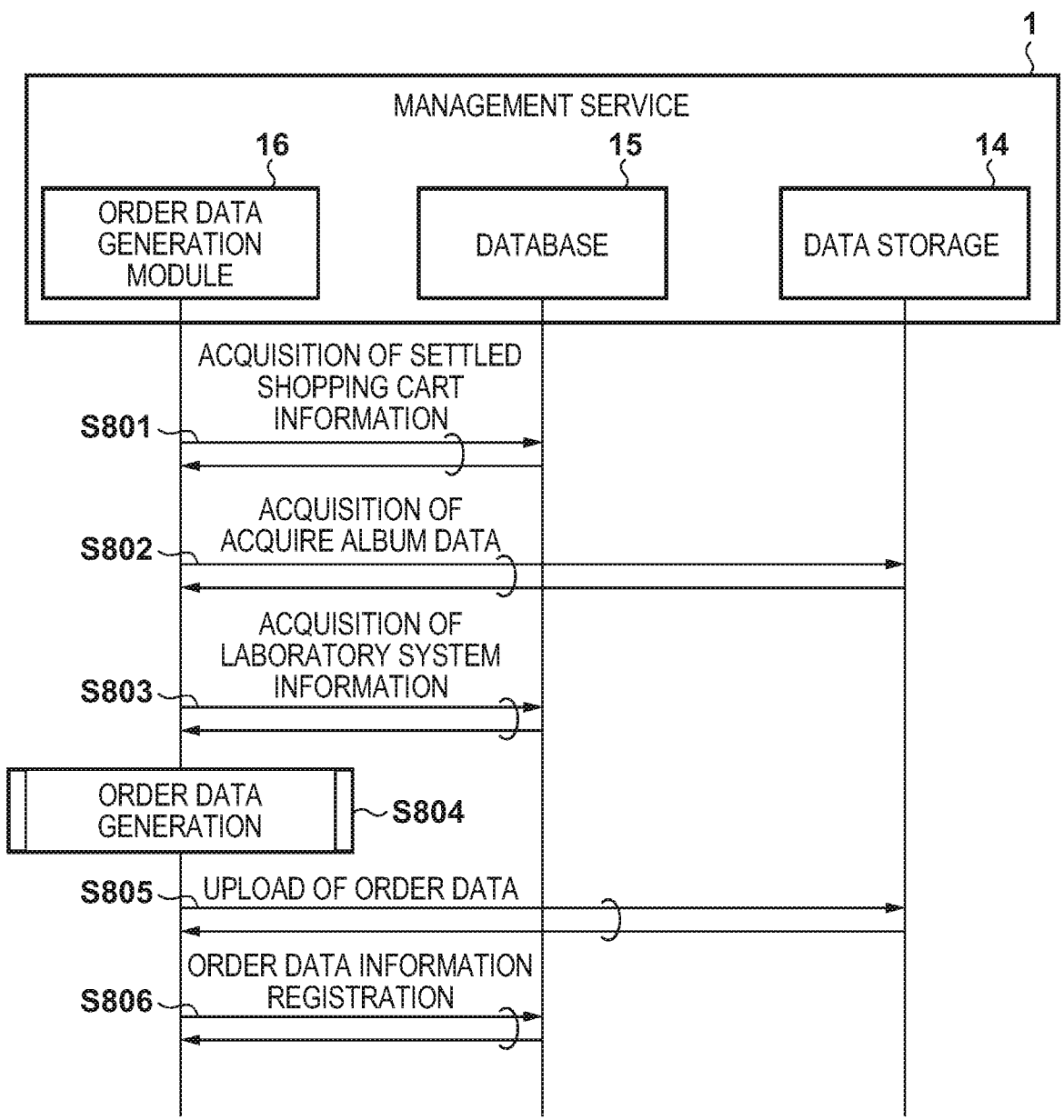
FIG. 8 is a sequence chart of conversion to order data acquirable by the laboratory system.

FIG. 8 is a sequence chart showing a processing procedure of acquiring shopping cart information with a status "settled" and converting the data into order data processable by the laboratory system 3 by the order data generation module 16 of the management service 1. Note that the sequence chart shown in FIG. 8 is implemented by, for example, reading out a program stored in a memory such as a ROM to a RAM and executing the program by the CPU in the information processing apparatus that constitutes the management service 1. The order data generation module 16 acquires shopping cart information updated to the "settled" status from the database 15 (step S801). The process of step S801 may be performed at the timing of updating the shopping cart information stored in the database 15 by the online store service I/F module 11 in step S710 of FIG. 7. In this case, the online store service I/F module 11 notifies the order data generation module 16 of the update timing. The order data generation module 16 may be configured to periodically monitor the shopping cart information stored in the database 15 and execute the process of step S801 upon finding shopping cart information with the status "settled".

The order data generation module 16 acquires photo album data associated with the acquired shopping cart information from the data storage 14 (step S802). The order data generation module 16 also acquires laboratory system information from the database 15 (step S803). After that, the laboratory system 3 caused to create the photo album is decided based on the online store service ID and the management service merchandise ID included in the shopping cart information. The order data generation module 16 decides the laboratory system 3 caused to create the photo album by, for example, looking up a laboratory system information table stored in the database 15.

FIG. 14 is a view showing an example of the laboratory system information table used by the management service 1 to decide the laboratory system 3 caused to create the photo album. The laboratory system 3 caused to create a photo album is often associated with the online store service 2. However, even for an order accepted by the same online store service 2, it may be necessary to select an optimum laboratory system 3 from a plurality of laboratory systems in accordance with the type of the photo album to be manufactured. Hence, in this embodiment, as shown in FIG. 14, the table is configured to uniquely decide the laboratory system 3 caused to create the photo album according to the online store service ID and the management service merchandise ID (an album merchandise ID shown in FIG. 14) included in the shopping cart information.

The order data generation module 16 generates order data based on the information of the laboratory system decided as the laboratory system 3 caused to create the photo album, the shopping cart information, and the photo album data (step S804). The photo album data may be included in the order data, or information such as path information needed by the laboratory system 3 to acquire the photo album may be included in the order data. The order data generation module 16 stores the generated order data in the data storage 14 (step S805), and registers order data information in the database 15 (step S806).

FIG. 15 is a view showing an example of order data that the management service 1 manages on the database 15. "Order data ID" is an identifier (key) uniquely representing order data. "Order data storage location path" is path information representing the storage location of the order data in the management service 1. "Status" stores information representing the processing state of the order data. For example, there are "unreceived" representing that order data is not received by the laboratory system 3, "received" representing that order data is received, and "shipped" representing that an album is created and shipped. "Assigned laboratory ID" stores the ID of the laboratory system 3 that acquires and processes the order data. "Delivery destination" and "desired appointed date for delivery" are information received from the online store service 2 and stored in the shopping cart information in step S709.

Figure 9:
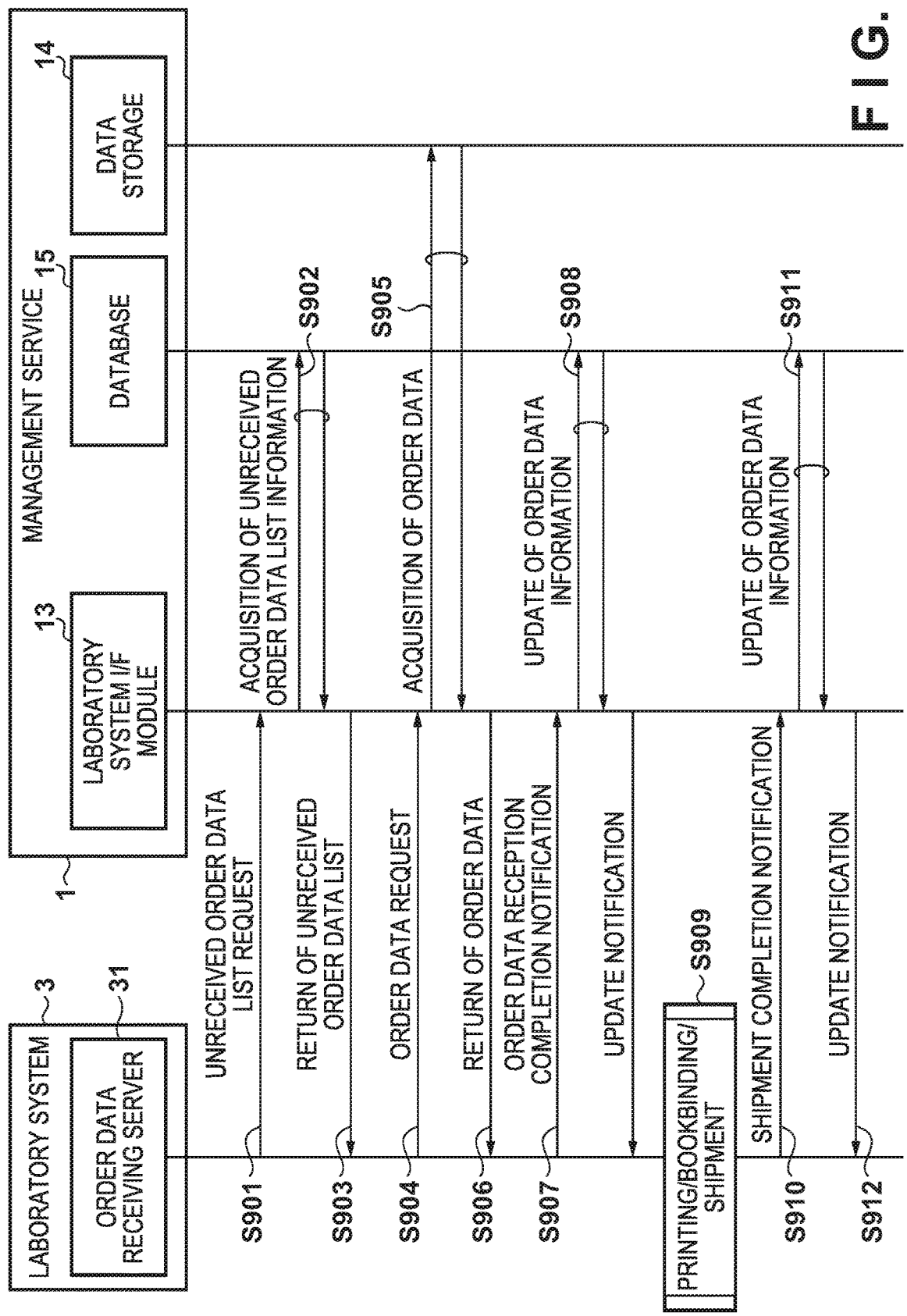
FIG. 9 is a sequence chart of creation and shipment of a photo album.

FIG. 9 is a sequence chart showing a processing procedure of acquiring order data from the management service 1 and performing creation and shipment of a photo album by the order data receiving server 31. Note that the sequence chart shown in FIG. 9 is implemented by, for example, reading out a program stored in a memory such as a ROM to a RAM and executing the program by the CPUs in the information processing apparatuses that constitute the management service 1 and the laboratory system 3. The management service I/F module 311 requests the list information of order data that the management service I/F module 311 has not received yet from the management service 1 (step S901). The laboratory system I/F module 13 acquires, from the database 15, the list information of order data that have a status "unreceived" and should be processed by the laboratory system 3 that has issued the request accepted in step S901 (step S902). The laboratory system I/F module 13 transmits the acquired order data list information to the order data receiving server 31 (step S903).

The management service I/F module 311 refers to the list information of the order data with the status "unreceived", which is received in step S903, and requests order data that has not received yet (step S904). The laboratory system I/F module 13 acquires order data corresponding to the request from the data storage 14 (step S905), and transmits it to the order data receiving server 31 (step S906).

The management service I/F module 311 stores the received order data in the data storage 314, and sends an order data reception completion notification to the laboratory system I/F module 13 (step S907). Upon receiving the reception completion notification, the laboratory system I/F module 13 updates the status of the corresponding order data stored in the database 15 to "received" (step S908). The laboratory system I/F module 13 then notifies the laboratory system 3 that the status of the order data is updated. The management service I/F module 311 performs the processes of steps S904 to S908 for all order data with the status "unreceived" in the order data list information.

The data conversion module 313 acquires unprocessed order data from the data storage 314, and converts it into print data used to manufacture a photo album by the printer 32 (interpretable by the printer 32). The data conversion module 313 transmits the converted print data to the printer 32 by the printer I/F module 312. Then, the printer 32 manufactures the photo album based on the received print data and ships it (step S909). For the order data whose shipment is completed, the management service I/F module 311 transmits a shipment completion notification to the management service 1 (step S910). Upon receiving the shipment completion notification, the laboratory system I/F module 13 updates the status of the order data corresponding to the received shipment completion notification, which is stored in the database 15, to "shipped" (step S911). The laboratory system I/F module 13 then notifies the laboratory system 3 that the status of the order data is updated (step S912).

Figure 18:
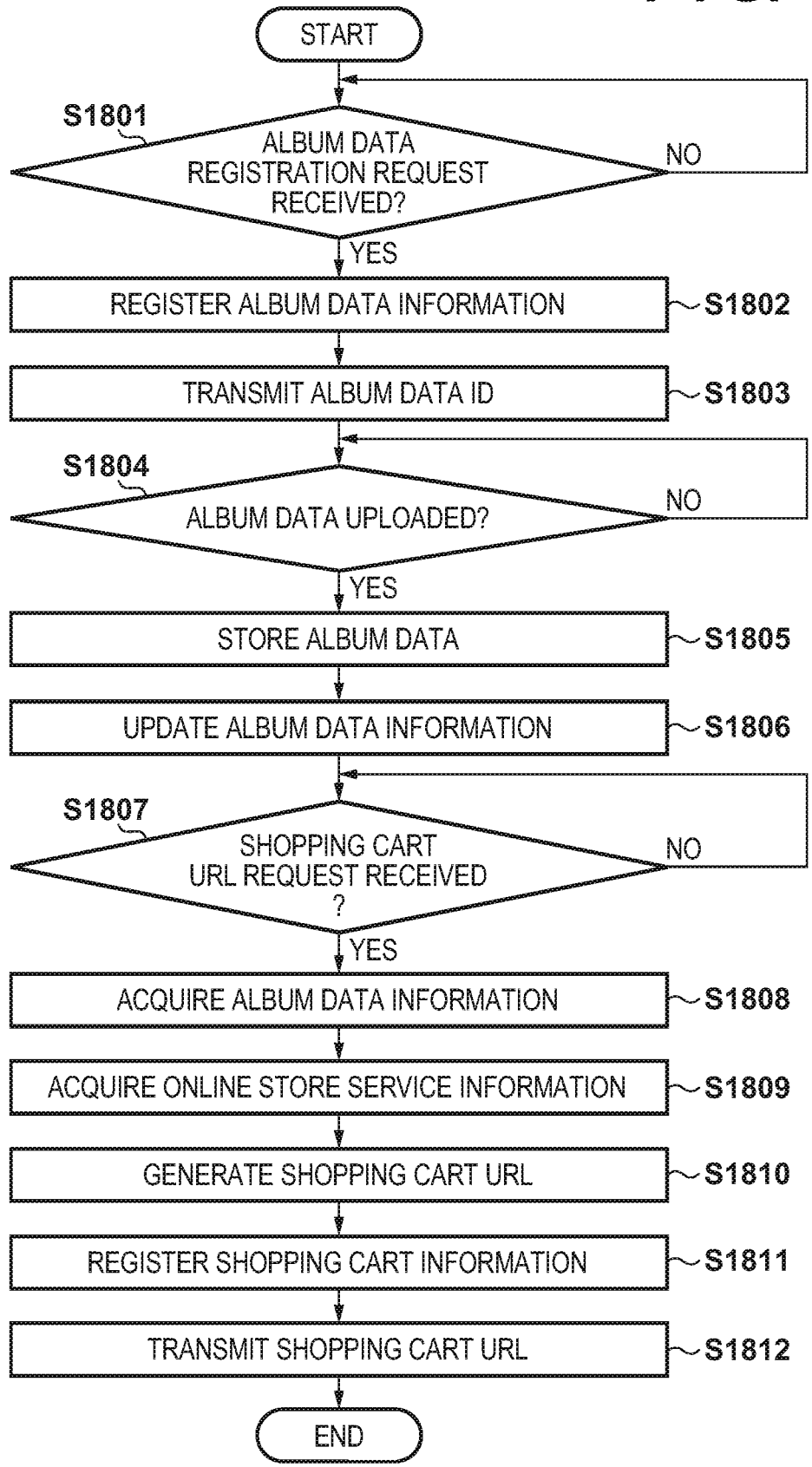
FIG. 18 is a flowchart showing the procedure of processing executed by the information processing apparatus of the management service.

FIG. 18 is a flowchart showing processing executed by the management service 1 between the management service 1 and the client terminal 4. Note that the management service 1 is formed from the information processing apparatus 1700, and the processes shown in FIGS. 18, 19, 20, 21, and 22 to be described later are implemented by, for example, reading out a program stored in the ROM 1703 to the RAM 1702 and executing the program by the CPU 1701.

Step S1801 is a process corresponding to step S602 of FIG. 6. The CPU 1701 determines whether a photo album data registration request is received from the client terminal 4. Upon determining that a photo album data registration request is not received, the process of step S1801 is repeated. Upon determining that a photo album data registration request is received, the process advances to step S1802.

Step S1802 is a process corresponding to step S603 of FIG. 6. The CPU 1701 executes album data ID generation and album data information registration according to the received registration request. Step S1803 is a process corresponding to step S604 of FIG. 6. The CPU 1701 transmits the generated album data ID to the client terminal 4.

Step S1804 is a process corresponding to step S605 of FIG. 6. The CPU 1701 determines whether photo album data is uploaded from the client terminal 4. Upon determining that photo album data is not uploaded, the process of step S1804 is repeated. Upon determining that photo album data is uploaded, the process advances to step S1805.

Step S1805 is a process corresponding to step S606 of FIG. 6. The CPU 1701 stores the uploaded photo album data in the data storage 14 in association with the album data ID. Step S1806 is a process corresponding to steps S607 and S608 of FIG. 6. The CPU 1701 updates album data information and transmits information representing that the album data information is updated to the client terminal 4 as a response to the upload.

Step S1807 is a process corresponding to step S609 of FIG. 6. The CPU 1701 determines whether a shopping cart URL request is received. Upon determining that a shopping cart URL request is not received, the process of step S1807 is repeated. Upon determining that a shopping cart URL request is received, the process advances to step S1808.

Step S1808 is a process corresponding to step S610 of FIG. 6. The CPU 1701 acquires album data information according to the request. Step S1809 is a process corresponding to step S611 of FIG. 6. The CPU 1701 acquires online store service information according to the request.

Step S1810 is a process corresponding to step S612 of FIG. 6. The CPU 1701 creates a shopping cart URL. Step S1811 is a process corresponding to step S613 of FIG. 6. The CPU 1701 registers the shopping cart URL. Step S1812 is a process corresponding to step S614 of FIG. 6. The CPU 1701 transmits the generated shopping cart URL to the client terminal 4. After that, the processing shown in FIG. 18 ends.

Figure 19:
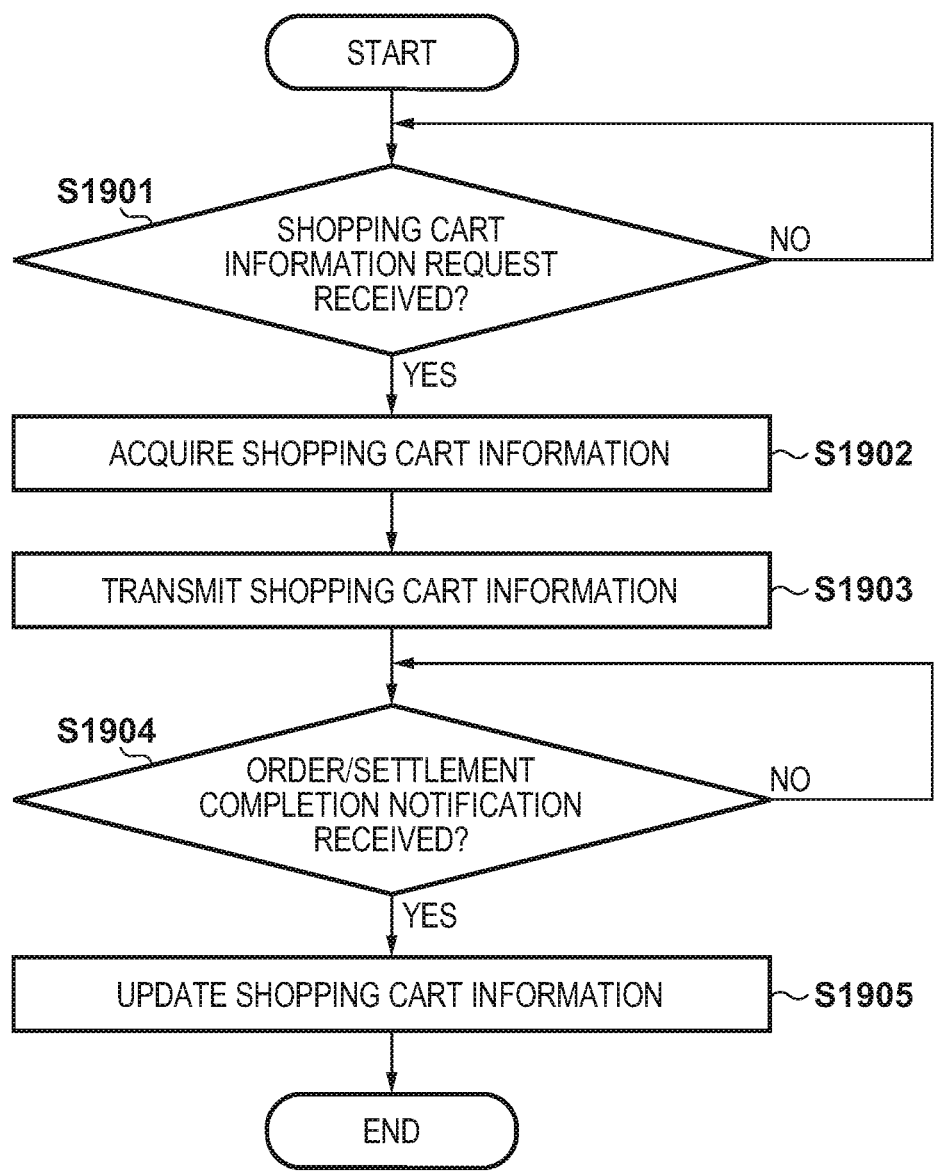
FIG. 19 is a flowchart showing the procedure of processing executed by the information processing apparatus of the management service.

FIG. 19 is a flowchart showing processing executed by the management service 1 between the management service 1 and the online store service 2.

Step S1901 is a process corresponding to step S702 of FIG. 7. The CPU 1701 determines whether a shopping cart information request is received from the online store service 2. Upon determining that a shopping cart information request is not received, the process of step S1901 is repeated. Upon determining that a shopping cart information request is received, the process advances to step S1902.

Step S1902 is a process corresponding to step S703 of FIG. 7. The CPU 1701 acquires shopping cart information according to the request. Step S1903 is a process corresponding to step S704 of FIG. 7. The CPU 1701 transmits the acquired shopping cart information to the online store service 2.

Step S1904 is a process corresponding to step S709 of FIG. 7. The CPU 1701 determines whether an order/settlement completion notification is received from the online store service 2. Upon determining that an order/settlement completion notification is not received, the process of step S1904 is repeated. Upon determining that an order/settlement completion notification is received, the process advances to step S1905.

Step S1905 is a process corresponding to steps S710 and S711 of FIG. 7. The CPU 1701 updates the shopping cart information and transmits information representing that the shopping cart information is updated to the online store service 2. After that, the processing shown in FIG. 19 ends.

Figure 20:
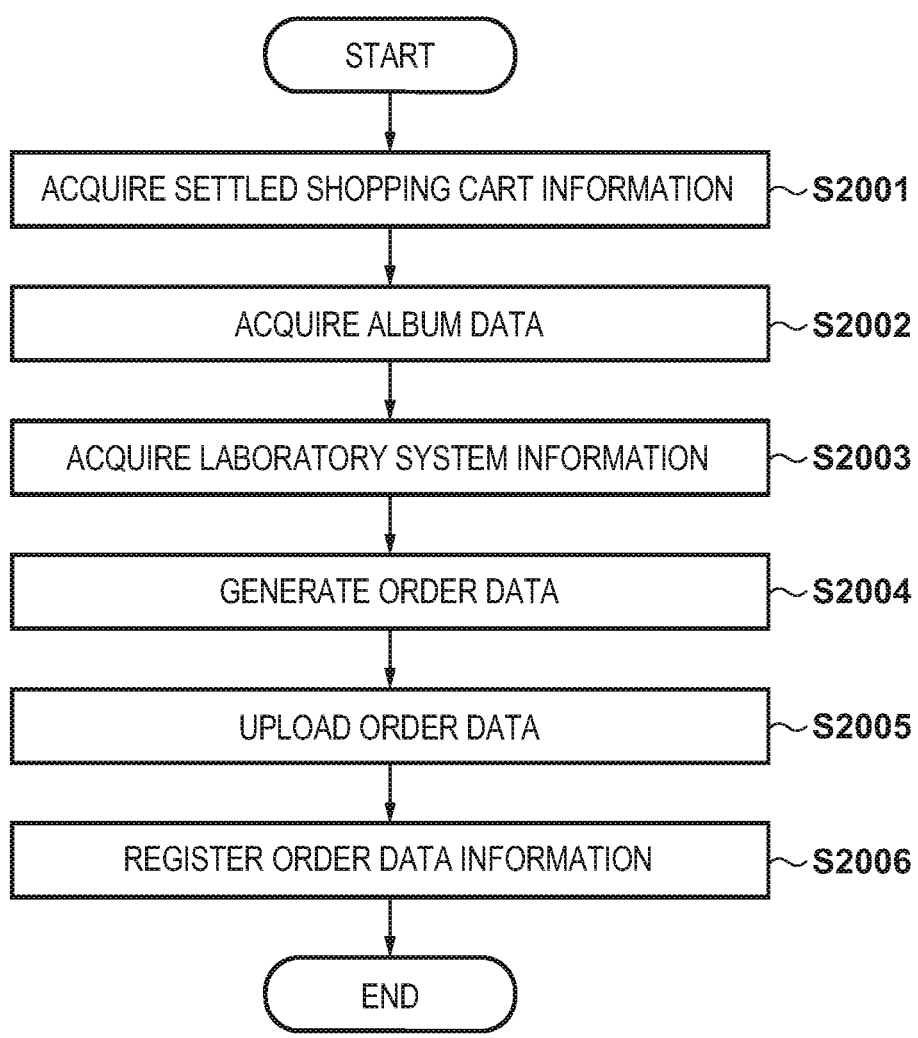
FIG. 20 is a flowchart showing the procedure of processing executed by the information processing apparatus of the management service.

FIG. 20 is a flowchart showing processing executed by the management service 1.

Step S2001 is a process corresponding to step S801 of FIG. 8. The CPU 1701 acquires settled shopping cart information. Step S2002 is a process corresponding to step S802 of FIG. 8. The CPU 1701 acquires album data. Step S2003 is a process corresponding to step S803 of FIG. 8. The CPU 1701 acquires laboratory system information.

Step S2004 is a process corresponding to step S804 of FIG. 8. The CPU 1701 generates order data. Step S2005 is a process corresponding to step S805 of FIG. 8. The CPU 1701 uploads the order data. Step S2006 is a process corresponding to step S806 of FIG. 8. The CPU 1701 registers order data information. After that, the processing shown in FIG. 20 ends.

Figure 21:
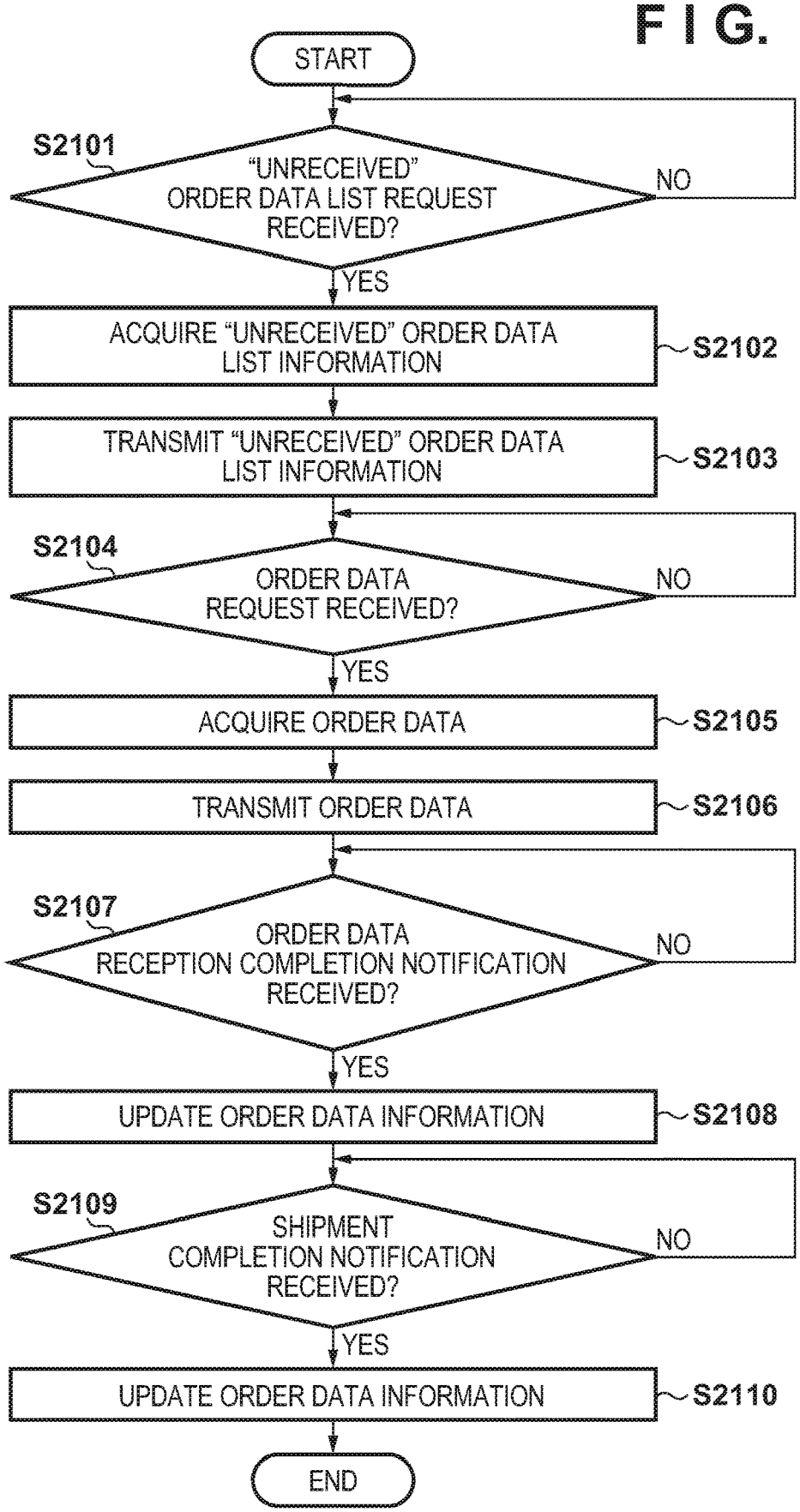
FIG. 21 is a flowchart showing the procedure of processing executed by the information processing apparatus of the management service.

FIG. 21 is a flowchart showing processing executed by the management service 1 between the management service 1 and the laboratory system 3.

Step S2101 is a process corresponding to step S901 of FIG. 9. The CPU 1701 determines whether an "unreceived" order data list information request is received. Upon determining that an "unreceived" order data list information request is not received, the process of step S2101 is repeated. Upon determining that an "unreceived" order data list information request is received, the process advances to step S2102.

Step S2102 is a process corresponding to step S902 of FIG. 9. The CPU 1701 acquires "unreceived" order data list information according to the request. Step S2103 is a process corresponding to step S903 of FIG. 9. The CPU 1701 transmits the acquired "unreceived" order data list information to the laboratory system 3.

Step S2104 is a process corresponding to step S904 of FIG. 9. The CPU 1701 determines whether an order data request is received from the laboratory system 3. Upon determining that an order data request is not received, the process of step S2104 is repeated. Upon determining that an order data request is received, the process advances to step S2105.

Step S2105 is a process corresponding to step S905 of FIG. 9. The CPU 1701 acquires order data according to the request. Step S2106 is a process corresponding to step S906 of FIG. 9. The CPU 1701 transmits the acquired order data to the laboratory system 3.

Step S2107 is a process corresponding to step S907 of FIG. 9. The CPU 1701 determines whether an order data reception completion notification is received from the laboratory system 3. Upon determining that an order data reception completion notification is not received, the process of step S2107 is repeated. Upon determining that an order data reception completion notification is received, the process advances to step S2108.

Step S2108 is a process corresponding to step S908 of FIG. 9. The CPU 1701 updates the order data information and notifies the laboratory system 3 of information representing that the order data information is updated. Step S2109 is a process corresponding to step S910 of FIG. 9. The CPU 1701 determines whether a shipment completion notification is received from the laboratory system 3. Upon determining that a shipment completion notification is not received, the process of step S2109 is repeated. Upon determining that a shipment completion notification is received, the process advances to step S2110.

Step S2110 is a process corresponding to steps S911 and S912 of FIG. 9. The CPU 1701 updates the order data information and notifies the laboratory system 3 of information representing that the order data information is updated. After that, the processing shown in FIG. 21 ends.

In this embodiment, the management service holds the correspondence information table (the table shown in FIG. 11) that associates each application with an online store service. Upon accepting upload of photo album data, the management service issues, to the client terminal, access information to the online store service associated with the application used to create the photo album data. By employing this form, the management service can provide a photo album service by a different online store service to the client terminal in accordance with an application installed in the client terminal. Additionally, since an online store service to be used is determined in accordance with each application, the user need not select the online store service to be used, and the user operability can improve. Furthermore, even in a form in which the user selects an online store service to be used, only online store services corresponding to each application can be presented to the user.

To add an application or an online store service to be supported by the management service, the information of the application or the online store service to be added is added to the correspondence information table. Note that at this time, the application or the online store service may newly be associated with an existing application or online store service. As described above, the management service according to this embodiment can support a plurality of different online store services by the single management service.

To provide a photo album service to a user, a management service that manages photo album data and the like is needed to accept photo album data created by the user or instruct a laboratory system to create an album. For this reason, in a case where an online store service is going to enter a photo album service, it needs to newly develop a management service. However, if there is a management service capable of supporting a plurality of online store services and capable of adding a supportable online store service as needed, as in this embodiment, the online store service need not newly develop a management service. This also applies to an album creation application. For example, the management service according to this embodiment can associate the information of a newcomer online store service with an application ID held by an existing album creation application. This enables the existing album creation application to make an order to the newcomer online store service. Hence, the online store service need not develop an album creation application.

Note that the client terminal creates photo album data using the application installed in the client terminal, as described above. However, the present invention is not limited to this form. For example, the client terminal may create album data using a web application provided via a web browser or the like. In this case, the client terminal communicates with the management server. The management server provides a photo album service by an online store service corresponding to the web application to the client terminal.

Second Embodiment

Concerning the second embodiment, points different from the first embodiment will be described below.

A client terminal 4 orders merchandise stored in a shopping cart. Hence, to order a plurality of pieces of merchandise at once, the client terminal 4 needs to add the merchandise to be ordered to the shopping cart one by one. FIG. 16 is a sequence chart showing a procedure of ordering a plurality of pieces of merchandise at once by the client terminal 4. Note that the sequence shown in FIG. 16 is implemented by, for example, reading out a program stored in a memory such as a ROM to a RAM and executing the program by CPUs in information processing apparatuses that constitute the client terminal 4 and a management service 1.

Steps S1601 to S1608 are the same as steps S601 to S608 of FIG. 6, and a description thereof will be omitted. Note that the processing shown in the sequence chart of FIG. 16 is executed in a state in which the processing shown in the sequence chart of FIG. 6 is performed, and a shopping cart URL is generated. That is, the processing is executed to accept input to upload new photo album data different from already uploaded photo album data and add a new photo album to the shopping cart.

In a case where upload processing of photo album data used to create a photo album to be newly added is completed in step S1608, the process advances to step S1609. In step S1609, the client terminal 4 requests to add the new photo album to an existing shopping cart. At this time, the client terminal 4 transmits a shopping cart URL received from the management service 1 before and an album data ID received in step S1604 in correspondence with the shopping cart to which the new photo album is to be added.

A client terminal I/F module 12 in the management service 1 acquires the information of the received shopping cart URL from a database 15, and determines whether the status of the corresponding shopping cart information is "unsettled" (step S1610). If the status is "unsettled", the client terminal I/F module 12 acquires album data information based on the album data ID received in step S1609 from the database 15 (step S1611). Next, the client terminal I/F module 12 additionally associates the album data information acquired in step S1611 with the shopping cart information acquired in step S1610, thereby updating the shopping cart information (step S1612). The new album is thus added to the shopping cart. In a case where the processing up to step S1612 is normally completed, the client terminal I/F module 12 transmits a shopping cart URL representing the shopping cart to which the new album is added to the client terminal 4 (step S1613).

In this embodiment, a plurality of pieces of album data information are held in association with shopping cart information. As a result, in step S704 of FIG. 7, the management service 1 can transmit the plurality of pieces of album data information at once in response to a shopping cart information request from an online store service 2.

Note that the image data, layout, number of pages, and the like of a photo album change for each order. For this reason, in a case where a plurality of photo albums are stored in the shopping cart, the online store service 2 needs to recognize that the plurality of photo albums have different contents and manage them. However, even if the photo albums have different contents, they are assigned the same online store service merchandise ID. Hence, in this embodiment, album data IDs may be transmitted in association with the plurality of pieces of album data information included in the shopping cart information transmitted in step S704. In a case where the album data IDs are different, the online store service 2 can recognize that the plurality of photo albums have different contents even if the online store service merchandise ID is the same. As a result, for example, the online store service 2 can generate a shopping cart page that allows the user to distinctively know that the pieces of merchandise included in the shopping cart are photo albums of individual contents. More specifically, the online store service 2 can generate, for example, a page in which the title of a photo album is added to a merchandise name or a page in which an icon created by reducing a predetermined page of a photo album is displayed in album data information.

Alternatively, the order/settlement completion notification in step S709 may be executed after individual order contents (the number of copies, the delivery destination, and the like) of each photo album, which are accepted on the online store service 2 from the user, are associated with an album data ID. As a result, the management service 1 can individually cope with the order requests of the plurality of photo albums having the same online store service merchandise ID.

Figure 22:
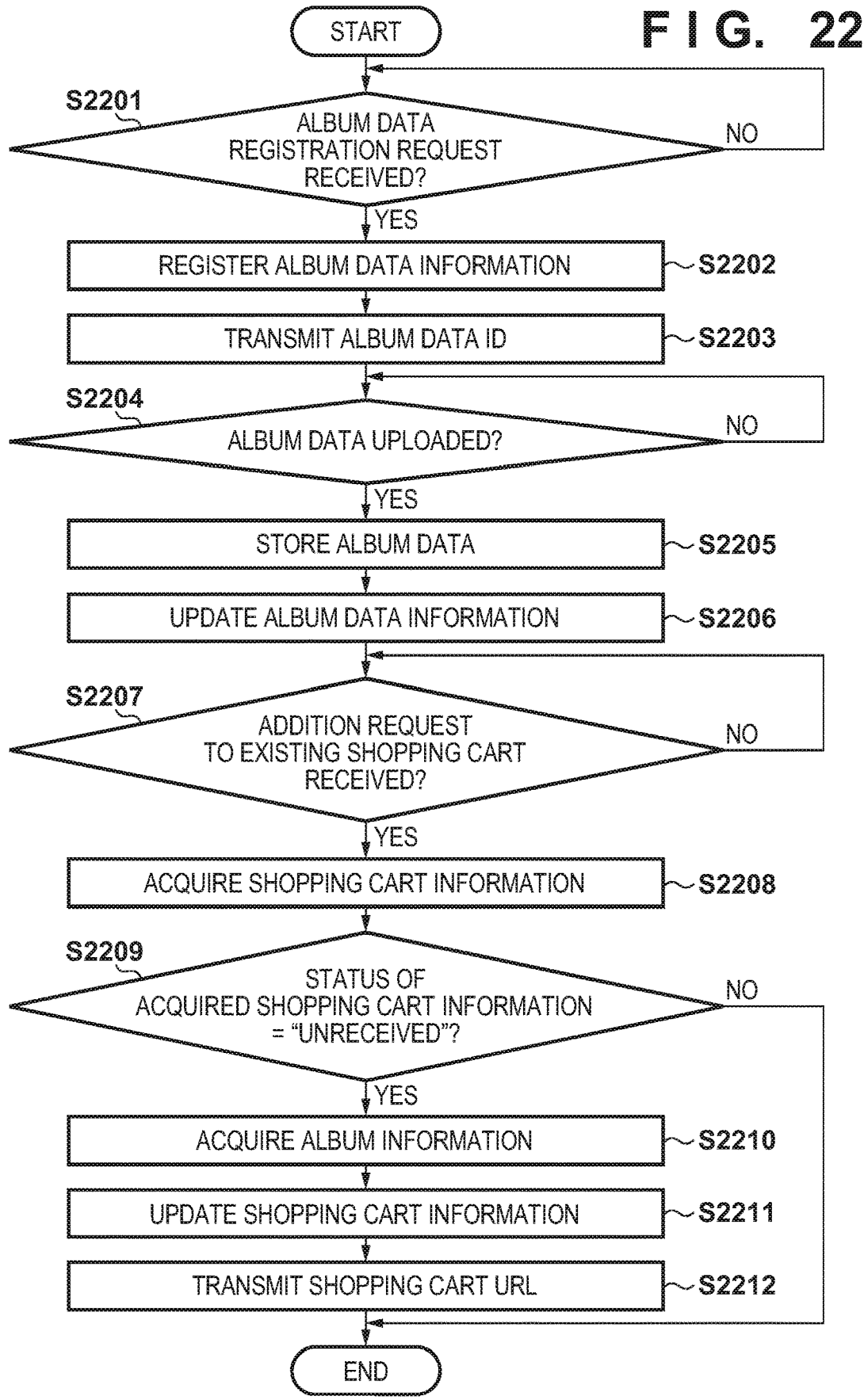
FIG. 22 is a flowchart showing the procedure of processing executed by the information processing apparatus of the management service.

FIG. 22 is a flowchart showing processing executed between the client terminal 4 and an information processing apparatus 1700 of the management service 1. The processes shown in FIG. 22 are implemented by, for example, reading out a program stored in a ROM 1703 to a RAM 1702 and executing the program by a CPU 1701.

Steps S2201 to S2206 are the same as steps S1801 to S1806 of FIG. 18, and a description thereof will be omitted.

Step S2207 is a process corresponding to step S1609 of FIG. 16. The CPU 1701 determines whether an addition request to an existing shopping cart is received. More specifically, the CPU 1701 determines whether a shopping cart URL transmitted to the client terminal 4 before and an album data ID are received. Upon determining that an addition request is not received, the process of step S2207 is repeated. Upon determining that an addition request is received, the process advances to step S2208.

Step S2208 is a process corresponding to step S1610 of FIG. 16. The CPU 1701 acquires shopping cart information according to the request. In step S2209, the CPU 1701 determines whether the status of the acquired shopping cart information is "unsettled". Upon determining that the status is "unsettled" (settlement is not yet performed), the CPU 1701 advances to step S2210. Upon determining that the status is not "unsettled", the CPU 1701 ends the processing without adding merchandise to the shopping cart. Note that at this time, the client terminal may be notified of an error. Alternatively, a shopping cart URL based on the newly uploaded album creation data may be generated by performing the processes of steps S1808 to S1812.

Step S2210 is a process corresponding to step S1611 of FIG. 16. The CPU 1701 acquires album data information according to the request.

Step S2211 is a process corresponding to step S1612 of FIG. 16. The CPU 1701 updates the shopping cart information. Step S2212 is a process corresponding to step S1613 of FIG. 16. The CPU 1701 returns the shopping cart URL to the client terminal 4. After that, the processing shown in FIG. 22 ends.

Third Embodiment

In the above embodiments, the description has been made assuming a photo album service. However, the embodiments can widely be applied to services that handle not only a photo album but also merchandise created or customized by a user. For example, in a service that sells wine with a label freely created by a buyer, a label creation application is installed in a client terminal 4. A laboratory system 3 is configured to create the label ordered by the user, paste the created label to a wine bottle, and ship it. With this arrangement, the same effects as in the above embodiments can be obtained.

The embodiments have been described above in detail. However, the present invention is not limited to the above embodiments, and various changes and modifications can be made within the spirit and scope of the present invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012851, filed Jan. 26, 2016, which is hereby incorporated by reference herein in its entirety.

What is claimed is:

1. A system including a client terminal capable of ordering merchandise of an online store service from a service providing system of a plurality of service providing systems each configured to provide the online store service and process an order of merchandise of the online store service, and an information processing apparatus capable of communicating with the client terminal, the client terminal comprises at least one processor to execute instructions to operate as:
a creation unit to create print data, including at least one image designated by a user, for printing the at least one image based on the image data, using a print data creation application, and
an upload unit to upload the created print data to the information processing apparatus,
the information processing apparatus comprises at least one processor to execute instructions to operate as:
a first reception unit to receive the uploaded print data;
a determination unit that, when the first reception unit receives the uploaded print data, determines a service providing system, of the plurality of service providing systems, which is associated with the print data creation application used to create the print data received by the first reception unit;
a first transmission unit to transmit access information used to make the client terminal access the determined service providing system;
the at least one processor of the client terminal further executes instructions to operate as:
a second reception unit to receive the access information from the information processing apparatus; and
an order unit to access the determined service providing system using the received access information and perform an order process to order a printed product created based on the print data uploaded to the information processing apparatus,
wherein, when the order process is performed, the printed product is created based on the uploaded print data.

2. The system according to claim 1, wherein when the print data creation application having a first identification information is used to create the print data, the service providing system corresponding to first identification information is determined from the plurality of service providing systems, and when the print data creation application having a second identification information is used to create the print data, the service providing system corresponding to second identification information is determined from the plurality of service providing systems.

3. The system according to claim 1, wherein the at least one processor of the information processing apparatus further executes instructions to operate as a data transmission unit to transmit the print data received by the first reception unit, to a printing system to create the printed product ordered to the determined service providing system, and wherein the printed product is created based on the print data transmitted to the printing system.

4. The system according to claim 1, wherein the at least one processor of the information processing apparatus further executes instructions to operate as a notification reception unit to, when the order process is performed, receive, from the service providing system, a notification indicating that the order process is performed, and wherein, when the notification is received, the printed product is created based on the print data.

5. The system according to claim 1, wherein the at least one processor of the information processing apparatus further executes instructions to operate as a control unit to control management information indicating an association between a print data creation application and a service providing system, and wherein the service providing system associated with the print data creation application used to create the print data received by the first reception unit is determined based on the management information.

6. The system according to claim 5, wherein the at least one processor of the information processing apparatus further executes instructions to operate as an edit unit to edit the management information so that a new service providing system is associated with the print data creation application which has already been managed by the management information.

7. The system according to claim 1, wherein the access information is a URL for displaying a screen indicating that a printed product created based on the uploaded print data is included in a shopping cart of the online store service provided by the determined service providing system.

8. The system according to claim 1, wherein the printed product is a photo album, and the print data is data for printing the photo album.

9. A method executed in a system including a client terminal capable of ordering merchandise of an online store service from a service providing system of a plurality of service providing systems each configured to provide the online store service and process an order of merchandise of the online store service, and an information processing apparatus capable of communicating with the client terminal, comprising:

creating print data, including at least one image designated by a user, for printing the at least one image based on the image data, using a print data creation application;

uploading the created print data to the information processing apparatus, receiving the uploaded print data;

when the uploaded print data used to order the merchandise of the online store service is received, determining a service providing system, of the plurality of service providing systems, which is associated with the print data creation application used to create the received print data;

transmitting access information used to make the client terminal access the determined service providing system;

receiving in the client terminal the access information from the information processing apparatus; and accessing the determined service providing system using the received access information and performing an order process to order a printed product created based on the print data uploaded to the information processing apparatus, wherein, when the order process is performed, the printed product is created based on the uploaded print data.

10. The method according to claim 9, wherein, when the print data creation application having a first identification information is used to create the print data, the service providing system corresponding to first identification information is determined from the plurality of service providing systems, and when the print data creation application having a second identification information is used to create the print data, the service providing system corresponding to second identification information is determined from the plurality of service providing systems.

11. The method according to claim 9, further comprising:

transmitting the print data received, to a printing system to create the printed product ordered for the determined service providing system, and wherein the printed product is created based on the print data transmitted to the printing system.

12. The method according to claim 9, further comprising:

when the order process is performed, receiving, from the service providing system, a notification indicating that the order process is performed, and wherein, when the notification is received, the printed product is created based on the print data.

13. The method according to claim 9, further comprising:

controlling management information indicating an association between a print data creation application and a service providing system, and wherein the service providing system associated with the print data creation application used to create the print data received is determined based on the management information.

14. The method according to claim 13, further comprising:

editing the management information so that a new service providing system is associated with the print data creation application which has already been managed by the management information.

15. The method according to claim 9, wherein the access information is a URL for displaying a screen indicating that a printed product created based on the uploaded print data is included in a shopping cart of the online store service provided by the determined service providing system.

16. The method according to claim 9, wherein the printed product is a photo album, and the print data is data for printing the photo album.

* * * * *